United States Patent
Gondor et al.

(12) 
(10) Patent No.: US 10,811,871 B2
(45) Date of Patent: Oct. 20, 2020

(54) LOW PROFILE SURGE PROTECTOR

(71) Applicant: TWGC PRODUCTS, LLC, Port Clinton, OH (US)

(72) Inventors: Anthony G. Gondor, LaGrange, OH (US); William Hubbard Carter, Port Clinton, OH (US)

(*) Notice: Subject to any disclaimer, the term of this patent is extended or adjusted under 35 U.S.C. 154(b) by 309 days.

(21) Appl. No.: 15/160,017

(22) Filed: May 20, 2016

(65) Prior Publication Data

US 2016/0344182 A1    Nov. 24, 2016

Related U.S. Application Data

(60) Provisional application No. 62/165,608, filed on May 22, 2015.

(51) Int. Cl.
| | | |
|---|---|---|
| *H02H 9/00* | (2006.01) | |
| *H02H 9/04* | (2006.01) | |
| *H02H 3/04* | (2006.01) | |

(52) U.S. Cl.
CPC ........... *H02H 9/005* (2013.01); *H02H 9/042* (2013.01); *H02H 3/04* (2013.01)

(58) Field of Classification Search
CPC ...................................................... H02H 9/005
See application file for complete search history.

(56) References Cited

U.S. PATENT DOCUMENTS

| | | | | |
|---|---|---|---|---|
| 3,873,951 | A * | 3/1975 | Blake | H01H 51/084 335/138 |
| 4,743,999 | A * | 5/1988 | Hames | H01R 13/6666 361/111 |
| 4,771,367 | A * | 9/1988 | Serr | H01R 13/713 361/102 |
| 5,399,093 | A * | 3/1995 | Schneider | H01R 24/28 439/21 |
| 7,914,292 | B2 * | 3/2011 | Honda | H01R 24/66 439/21 |
| 2007/0002511 | A1 * | 1/2007 | Chaudhry | H02H 9/042 361/118 |

* cited by examiner

*Primary Examiner* — Stephen W Jackson
(74) *Attorney, Agent, or Firm* — McCarthy, Lebit, Crystal & Liffman Co. LPA

(57) ABSTRACT

An improved low profile surge protector is provided that minimizes the space necessary between powered devices and power sources. The present invention provides protection for overvoltage events while using existing, standard household outlets and allows for slimmer devices to mount as close as possible to a wall without leaving unappealing gaps between the device and the wall.

3 Claims, 2 Drawing Sheets

LOW PROFILE SURGE PROTECTOR

RELATED APPLICATIONS

The present application claims priority of the provisional application 62/165,608 filed May 22, 2015.

BACKGROUND OF THE INVENTION

Field of the Invention

The present invention is generally directed to a surge protector and, more particularly, to a novel and improved low profile in-line surge protector having certain rotational capabilities.

Description of the Related Art

Surge protectors are used to protect electronic devices and power systems from prolonged overvoltage events, such as those caused by lightning for example. Historically, typical surge protectors are quite bulky. Available, so called, "low profile" surge protectors take up considerable space even without the additional use of a recessed plug or clock outlet which provides extra void space set into the wall.

Additionally, the current trend, particularly in consumer electronics, is low profile, and wall-mounted devices. Flat screen televisions mounted on the wall are now seemingly more commonplace than televisions found on stands or tables. As more and more consumer electronics incorporate sleeker and slimmer designs, the accompanying components must also be tailored with low profiles to accommodate the slimmer designs and desired display methods. In the case of a wall-mounted flat screen television, the space between the wall and television is extremely limited. The optimal mounting method is to reduce that space as much as possible so the television is nearly flush with the wall. However, some components, such as available surge protectors, that are required to safely use the television can make it nearly impossible to minimize this space. In view of the foregoing deficiencies, applicant's invention is presented herein. More specifically, the present invention improves upon available low profile surge protectors to minimize the space necessary to provide protection for overvoltage events while still using existing household outlets in a cost efficient manner.

SUMMARY OF THE INVENTION

It is therefore an object of the present invention to provide a low profile surge protector having certain rotational capabilities that can be used with existing, standard household outlets.

Briefly described according to the preferred embodiment of the present invention, the aforementioned objects of the present invention are attained by providing an improved in-line low profile surge protector formed with a 90 degree flat grounded plug which itself has 360 degree rotational capabilities. "Low-profile" when used with the device of the instant invention is preferably intended to designate a total thickness dimension of less than about three-quarters of an inch, and even more preferably less than 0.6 inch, significantly less than existing products.

BRIEF DESCRIPTION OF THE DRAWINGS

Advantages and features of the present invention are better understood with reference to the following more detailed description and claims taken in conjunction with the accompanying drawings, in which like elements are identified with like symbols, and in which:

DESCRIPTION OF THE PREFERRED EMBODIMENT

Detailed Description of the Figures

Figure 1:
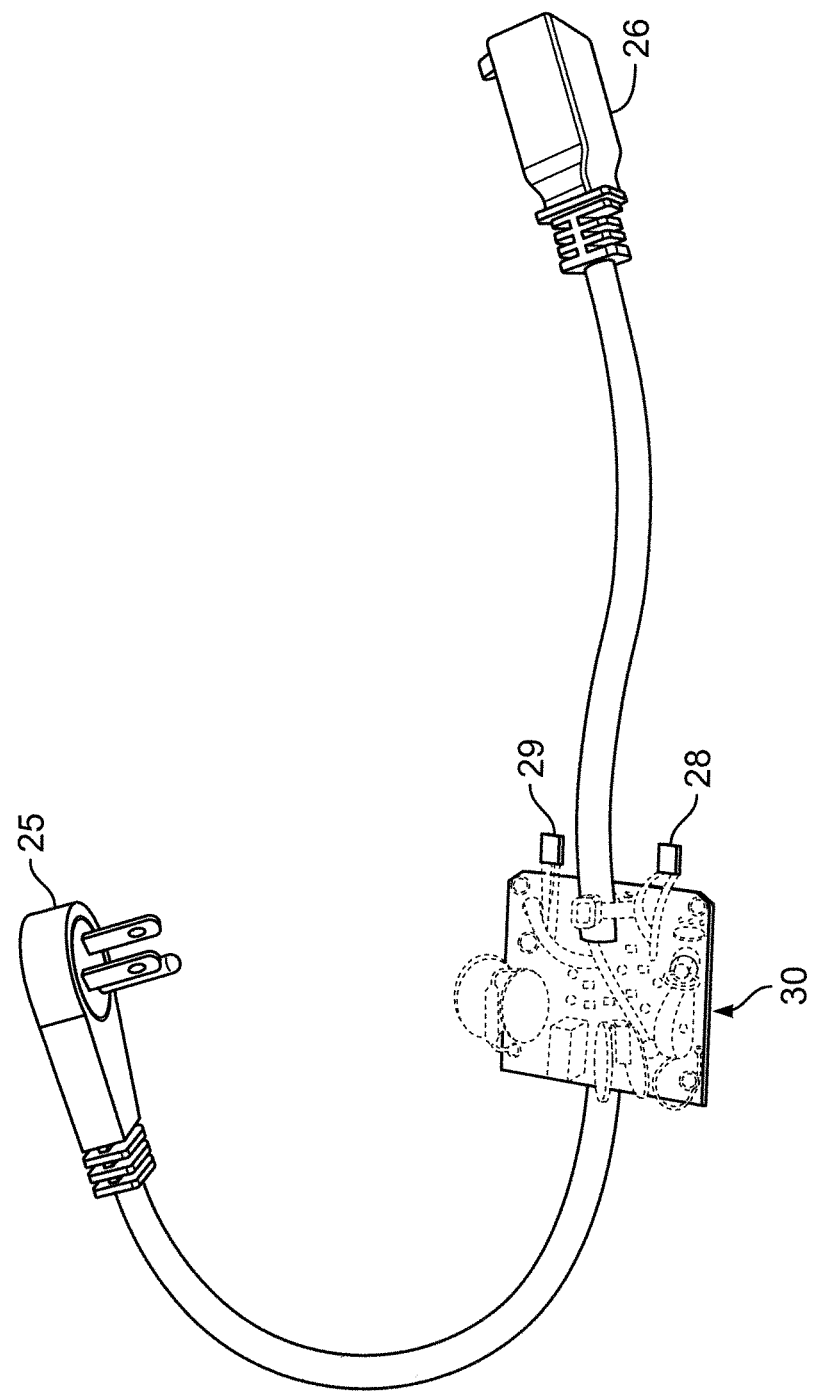
FIG. 1 is a perspective view of a low profile surge protector.
Figure 2:
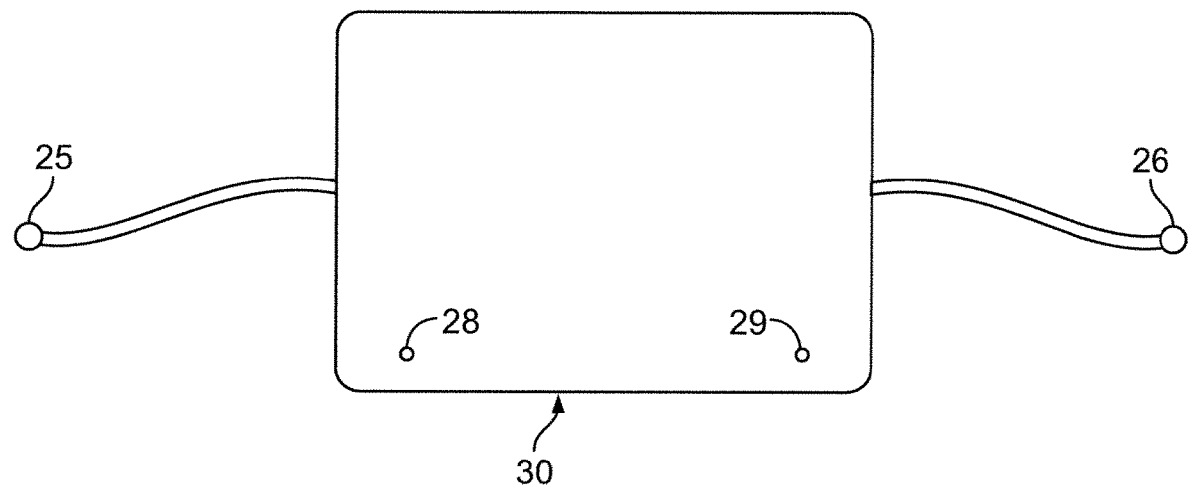
FIG. 2 is an outline perspective view depicting the low profile surge protector.
Figure 3:
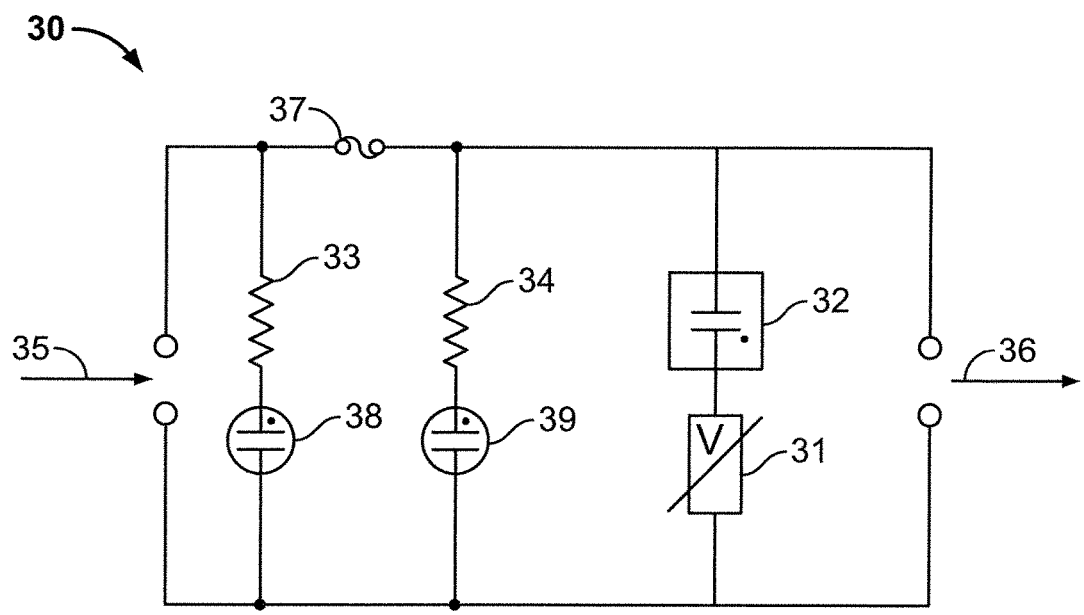
FIG. 3 is a circuit diagram of a circuit illustrating surge protection circuitry useful in the instant invention.

The best mode for carrying out the invention is presented in terms of its preferred embodiment, herein depicted within FIGS. 1-3, in which an improved in-line low profile surge protector is provided utilizing a 90 degree flat grounded plug which itself has 360 degree rotational capabilities. The present invention is described herein as used in connection with a flat-screen television although it should be understood that the device of the instant disclosure is in no way limited to such a device and may be used in connection with any number of electronic devices.

As indicated above, "low-profile" when used with the device of the instant invention is preferably intended to designate a total thickness dimension of less than about three-quarters of an inch, and even more preferably less than 0.6 inch. The present invention also includes mountable means to attach it to the powered device or wall. The overall thickness being significantly less than previous inventions and mountability of the present invention minimize the necessary space between the television and wall and allows for the television to mount on the wall in the ideal, nearly flush position. In addition, the present invention is capable of 360 degree rotation at the male connector of the power cable to further allow for minimal necessary space.

It is intended that the present invention does not require recessed plugs or clock outlets to minimize space. The present invention can be used with standard household outlets and still require minimal space between the television and wall.

It is anticipated that at least two color light-emitting diodes (LEDs) be incorporated into the device. In this manner they can be used to indicate when power and surge protection are established. Further, an audible alarm can be incorporated to signal a fault and indicate when the device is no longer protected.

Operation of the Preferred Embodiment

The surge protector is capable of use with existing household outlets. The present invention has 360 degree rotation capability in order to ensure a minimal amount of space is used. To further minimize space utilized by the present invention, the surge protector has mountable means by which to attach it to the powered device or wall.

As shown in FIG. 2 surge protector circuit is connected via electrical cords 25 and 26 to the input and output sides of the circuit respectively. Output cord 26 is a standard female electrical cord useful in many applications. Input cord 25 includes a rotatable male, 3-pronged connector, allowing for 360 degrees of rotational motion of the cord and surge protector circuit 30 relative to the location in which the male connector is plugged.

One basic surge suppression circuit 30 shown in FIG. 3 consists of a voltage dependent resistor 31 and gas surge suppressor 32 connected in series. The protection circuit is connected between input 35 and output 36. The circuit illustrated herein and portrayed in FIG. 3 is one preferred surge protection circuit, but other well-known surge protection circuits may be substituted as one skilled in the art would readily appreciate.

Voltage dependent resistor 31 is an electronic component with a "diode-like" nonlinear current-voltage characteristic. Voltage dependent resistor 31 is of the type often used to protect circuits against excessive transient voltages by incorporating them into the circuit in such a way that, when triggered, they will shunt the current created by the high voltage away from the sensitive components. The function of voltage dependent resistor 31 is to conduct significantly increased current when voltage is excessive.

Normally no current flows through voltage dependent resistor 31 and gas surge suppressor 32. When the voltage between the terminals is higher than the sum of voltage ratings of voltage dependent resistor 31 and gas surge suppressor 32, current starts to flow through those components. If the voltage rises, then more current starts to flow through voltage dependent resistor 31 and gas surge suppressor 32, until the flowing current exceeds the specified value of self-resettable fuse 37, at which current fuse 37 will break and the circuit will be protected. Thus, the current cannot rise much above that predetermined value set by the sum of the voltages of voltage dependent resistor 31 and gas surge suppressor 32. When the voltage again goes back to normal values of the voltage dependent resistor 31 and gas surge suppressor 32, the conducting through 31 and 32 stops, the self-resettable fuse 37 resets, and the circuit returns to normal. After the current returns to normal, and the fuse 37 has reset and continues its functioning, the circuit is again protected against short circuit and overload. The circuit is designed to protect sensitive electronic devices against overvoltage transients in normal mains voltage and overload/short circuit. Two LED lamps 38 and 39 are also provided with the circuit diagram to show the status of input and load supply.

The aforenoted components may be mounted on a single circuit board in a manner such that their profile is minimized and their thickness dimension is preferably less than 0.75 inch and more preferably less than 0.6 inch.

When connected to the power source and the device, the LEDs (shown in FIG. 3 as 38, 39) indicate if power is being supplied and if protection is established. Another embodiment of the present invention includes an audible alarm to indicate a fault has occurred and the television is no longer protected.

The foregoing descriptions of specific embodiments of the present invention have been presented for purposes of enabling an illustration and description of the preferred embodiment. They are not intended to be exhaustive or to limit the invention to the precise forms disclosed, and obviously many modifications and variations are possible in light of the above teaching. What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. It is intended that the scope of the invention be defined by the following claims.

What is claimed is:

1. An in-line low profile surge protector comprising in combination:
    a means of providing protection for overvoltage events having a housing containing surge protection circuitry and said housing having a thickness of less than about three-quarters of an inch;
    an alternating current electrical input means with a cord feeding into the surge protection housing and a male connector with a separate housing from the surge protection housing;
    an alternating current electrical output means with a cord feeding out of the surge protection housing and a female connector with a separate housing from the surge protection housing;
    the separate male connector further comprising a rotational element allowing rotational motion of the electrical cord and surge protector relative to the outlet.

2. The device of claim 1, wherein the means of providing protection for overvoltage events further comprises at least two color light indicators, indicative of the status of the circuit being protected.

3. The device of claim 1, wherein the means of providing protection for overvoltage events further comprises an audible alarm indicator, indicative of the status of the circuit being protected.

* * * * *